Figure 1:
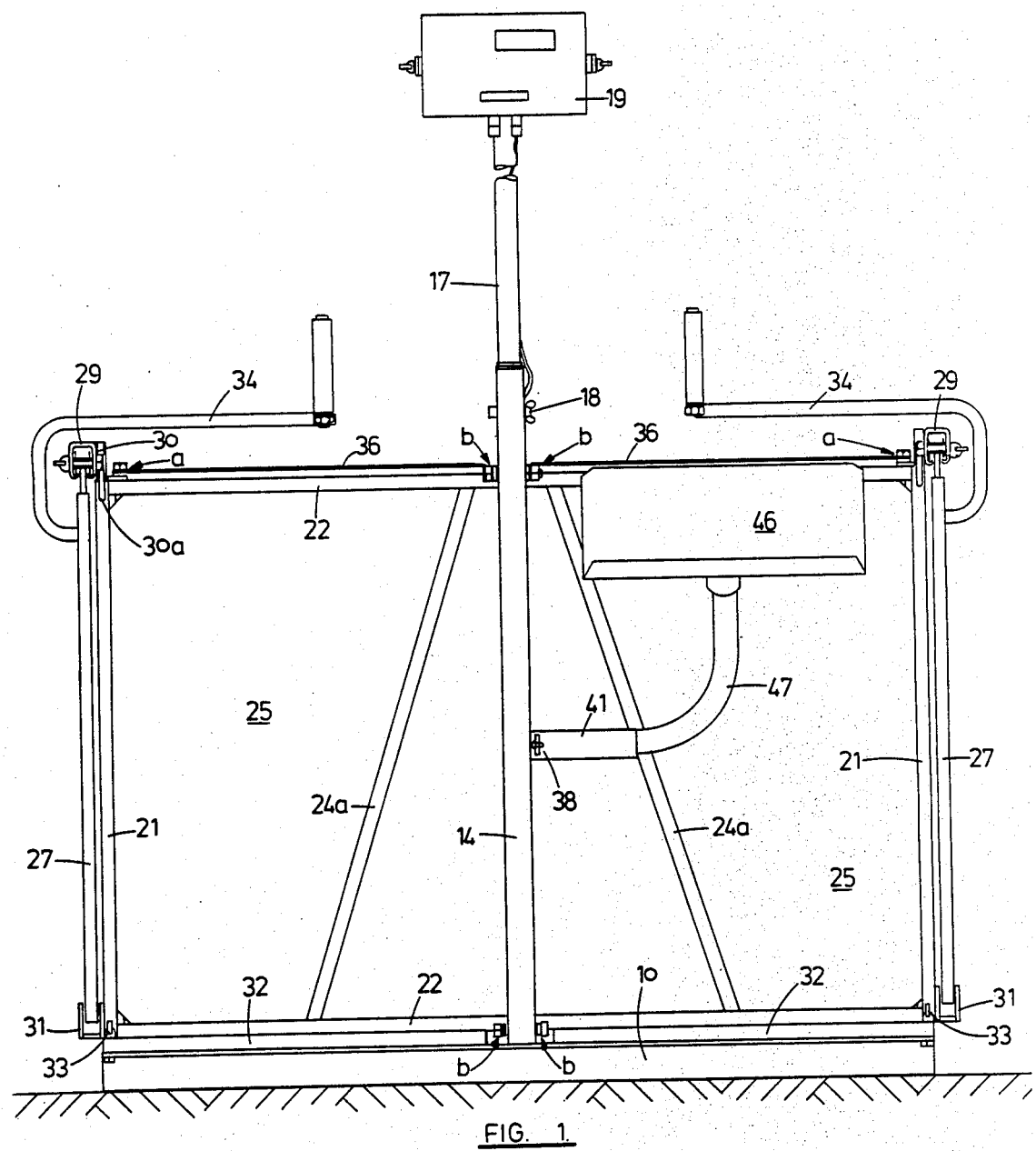

United States Patent [19]

Mills

[11] Patent Number: 4,470,471
[45] Date of Patent: Sep. 11, 1984

[54] WEIGHING APPARATUS

[75] Inventor: Robert A. Mills, Hamilton, New Zealand

[73] Assignee: The Director General of the Ministry of Agriculture and Fisheries, Wellington, New Zealand

[21] Appl. No.: 503,874

[22] Filed: Jun. 13, 1983

[51] Int. Cl.³ .................... G01G 19/52; G01G 23/00; G01G 21/12
[52] U.S. Cl. .................................. 177/132; 177/245; 177/255
[58] Field of Search ............... 177/132, 245, 263, 255, 177/154, 156

[56] References Cited

U.S. PATENT DOCUMENTS 2,873,106  2/1959  Fassbinder ......................... 177/255
3,726,353  4/1973  Christensen .................... 177/245 X

FOREIGN PATENT DOCUMENTS 0041127  12/1981  European Pat. Off. ............ 177/132

Primary Examiner—E. A. Goldberg
Assistant Examiner—Patrick W. Foster

[57] ABSTRACT

Weighing apparatus, which is suitable for weighing livestock. The apparatus is formed by a crate, which is open at at least one end and provides a platform on which an object to be weighed may be located, and a frame encompassing but spaced from said crate. The crate is slung by a single point from said weighing device mounted by the frame.

Crate restraining means maintain said crate in a spaced relationship from the frame. The restraining means comprises a single flexible member and a single anchor point and tie on each end of said crate and a single mounting on opposite sides of said frame. The arrangement is such that in use when said flexible member is tensioned and anchored the crate is restrained from lateral movement against the frame without affecting vertical loading on the single point weighing device.

16 Claims, 8 Drawing Figures

WEIGHING APPARATUS

This invention relates to a weighing apparatus. More particularly it relates to a weighing apparatus particularly suited for weighing livestock and to a restraining system to avoid contact between the weighing crate and the associated frame.

Animal weighing devices of the type of this invention are known. Such devices are of the type comprising a crate or passageway through which the animal to be weighed passes. The crate is usually capable of being closed at either end so that a weight is taken while the animal is within the weighing crate. The crate itself is usually suspended from a single vertical suspension point and it is restrained by means of a restraining system usually made of flexible members to maintain the crate in position, to transfer vertical loads to the suspension point and to avoid contact between the crate and the associated frame. In known devices of these types the restraining system consists of flexible members in the horizontal direction. The disadvantage with known restraining systems of this type is that there are a large number of anchor points and ties for the flexible restraining members which complicate procedures for setting up the weighing scales.

It is an object of this invention to go some way towards overcoming these disadvantages or at least to offer the public a useful choice.

Accordingly the invention may be said broadly to consist in a weighing apparatus suitable for weighing livestock comprising:
  a crate open at at least one end providing a platform on which an object to be weighed may be located,
  a frame encompassing but spaced from said crate,
  a single point weighing device on said frame, said crate being slung from said weighing device,
  crate restraining means for maintaining said crate spaced from said frame comprising a single flexible member and a single anchor point and tie on each end of said crate and a single mounting on opposite sides of said frame, the arrangement being such that in use when said flexible member is tensioned and anchored said crate is restrained against lateral movement against said frame without affecting vertical loading on said single point weighing device.

This invention may also broadly be said to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

Figure 2:
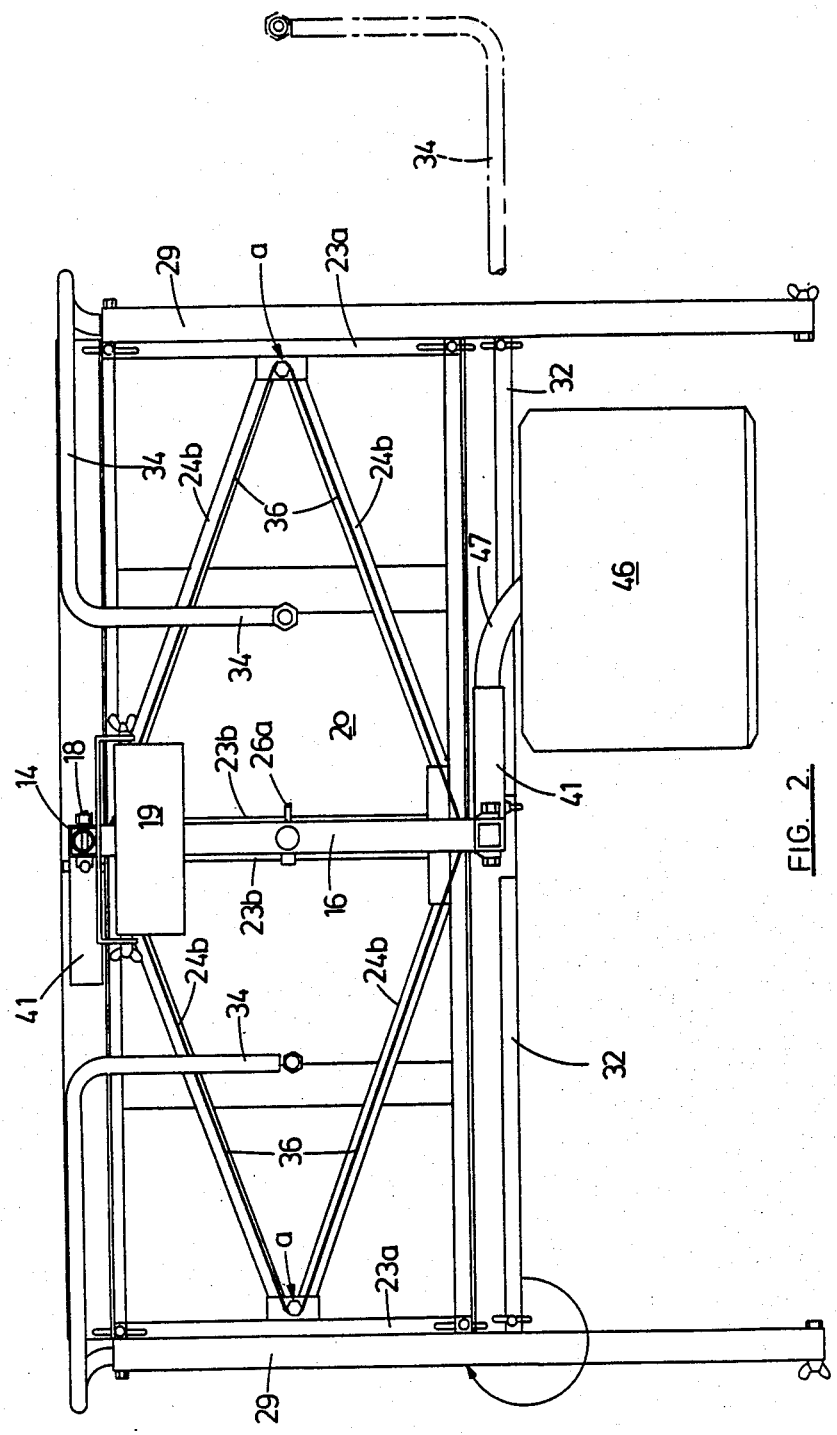
Figure 3:
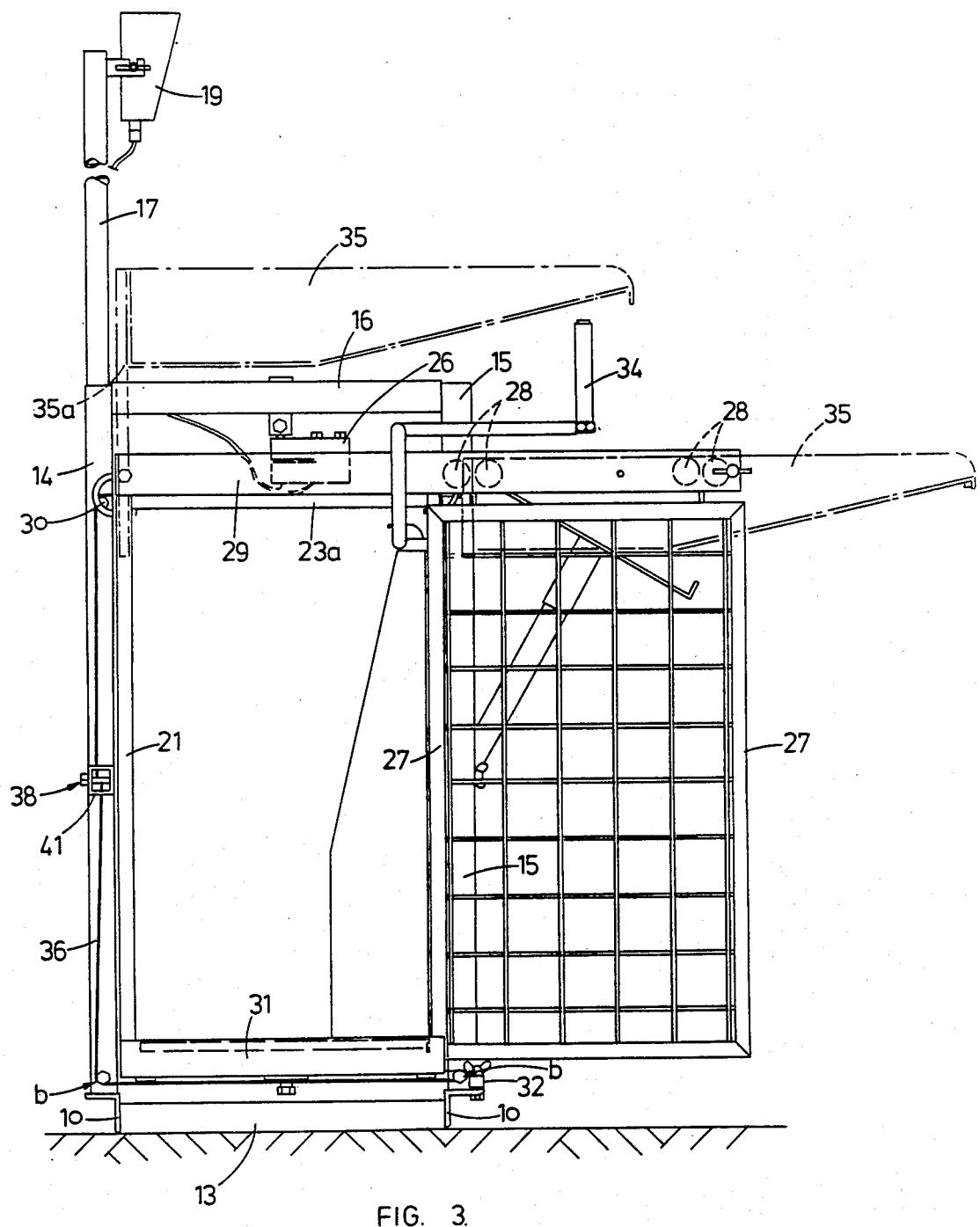
Figure 4:
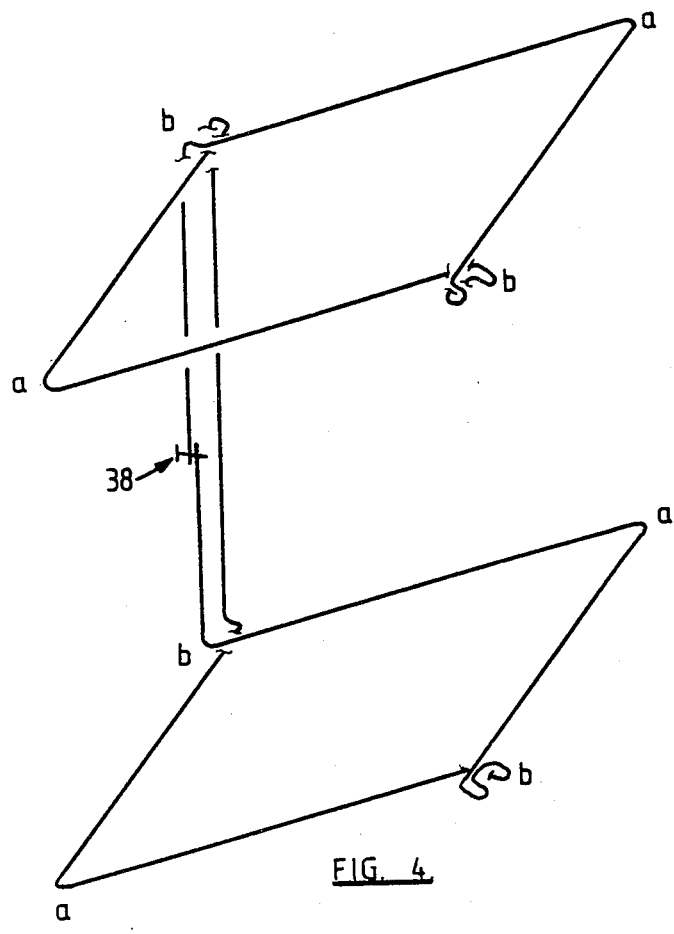
Figure 5:
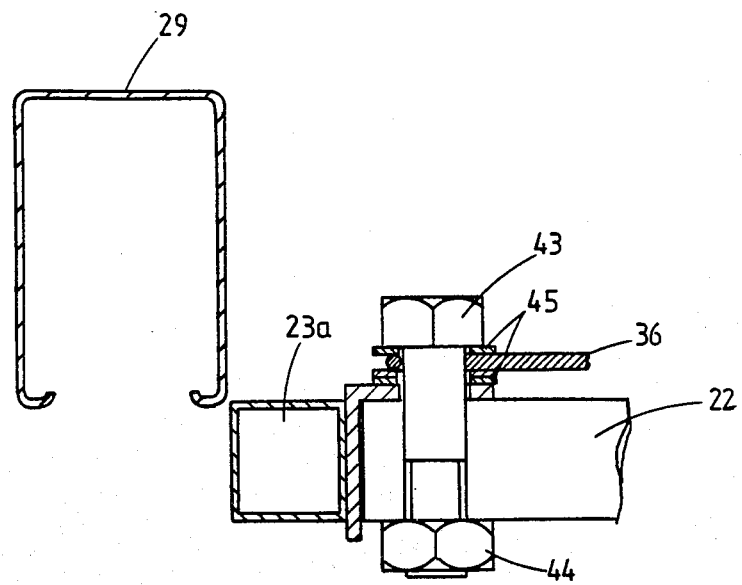
Figure 6:
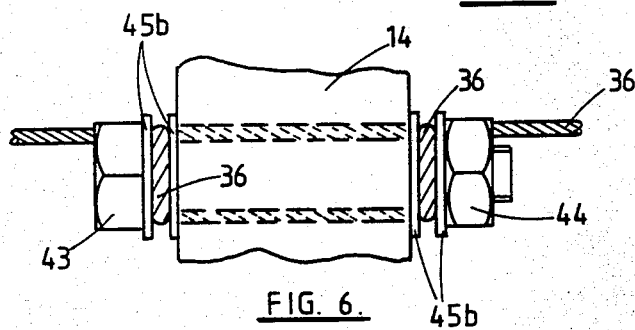
Figure 7:
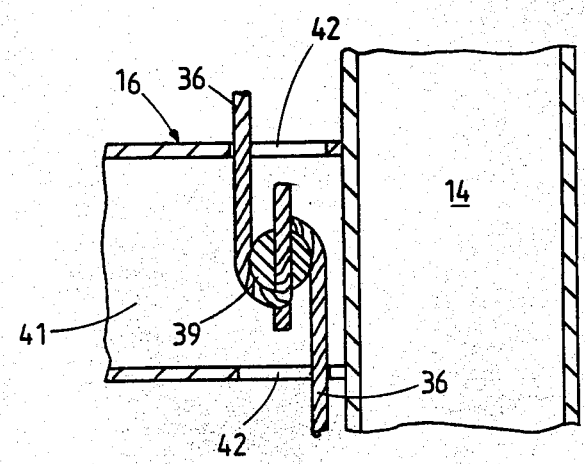
Figure 8:
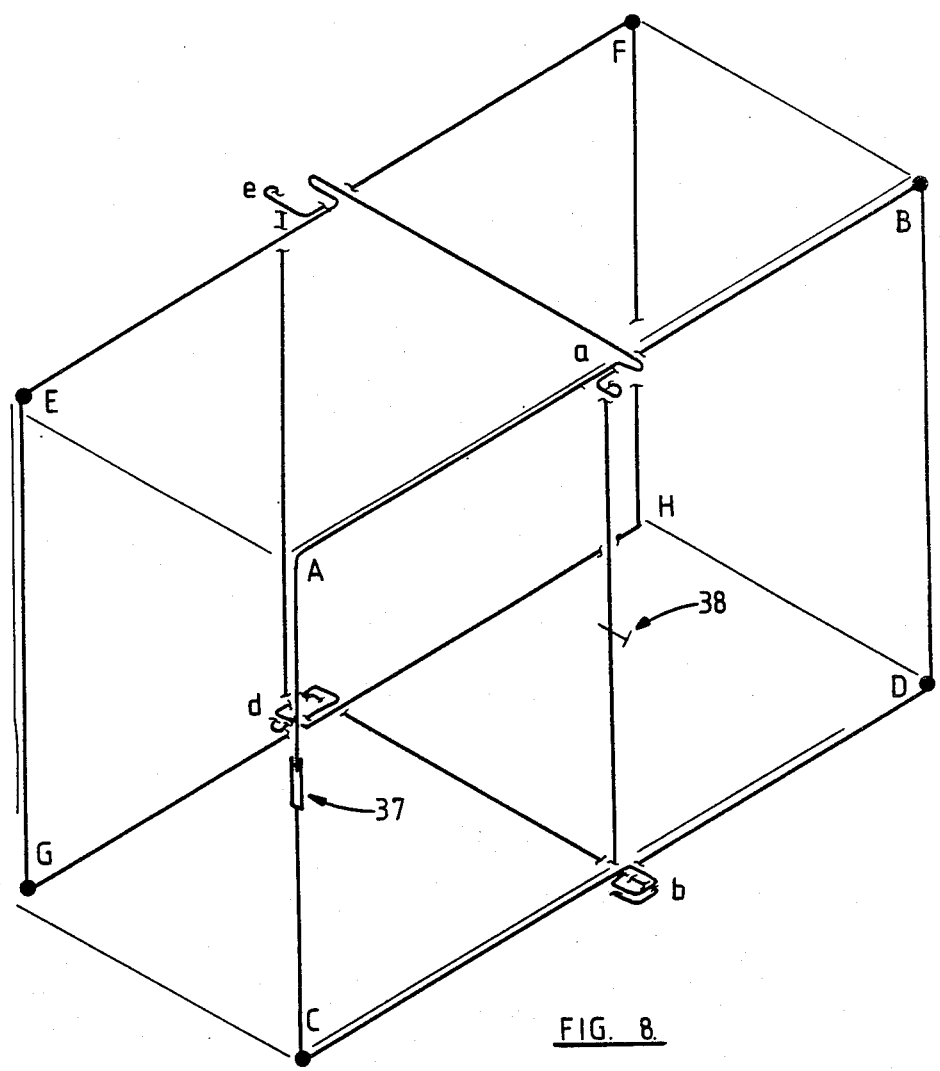

In the following more detailed description of one embodiment of the invention reference will be made to the accompanying drawings in which:

FIG. 1 is a side elevation view of the device without the the restraining wires in position, FIG. 2 is a top plan view of the embodiment shown in FIG. 1, FIG. 3 is an end elevation of the embodiment shown in FIG. 1, FIG. 4 is a schemmatic isometric diagram of the restraining system of the invention, FIG. 5 is detail A of FIG. 2, FIG. 6 is detail B of FIG. 1, FIG. 7 is detail C of FIG. 1, and FIG. 8 is a similar view to FIG. 4 but showing a second form of the restraining system.

The main frame comprises a pair of parallel rails 10 joined by a pair of cross-members 13. Projecting upwardly from rails 10, at about the midpoint of the length of each rail, are uprights 14 and 15. These uprights are joined at their upper ends by a cross-member 16. Each upright 14 and 15 is conveniently of tubular form whereby the lower end of a post 17 on which a display unit 19 is mounted can be engaged and fixed into position by a mechanical fastening 18. The display unit 19 can be a conventional single LC read-out (of, for example, the type manufactured by True-Test Distributors Limited) which gives the weight of an object being weighed when that object is positioned in the weighing crate or on a tray or like support attached to the crate.

The weighing crate consists of a floor 20 which is constructed of any convenient material such as sheet metal with a non-slip surface, or an all-weather plywood or particle board. A rectangular frame, consisting of tubular uprights 21 and longitudinal members 22, projects form each long side of the base 20 and these frames are coupled at each upper corner by a cross-member 23a. Diagonal cross-bracing members 24a extend between the upper and lower longitudinal members 22. Extending midway in the length of the crate and between longitudinal members 22 are a pair of spaced apart parallel members 23b. Diagonally positioned bracing members 24b extend between these transverse members 23b and the end cross-members 23a as can be seen in FIG. 2. Each frame is clad with a suitable cladding 25 such as sheet metal, light plywood or the like.

Mounted by frame cross-member 16 is a single load cell 26. The weighing crate is suspended form this load cell by being fixed to a pin located between transverse members 23b. Preferably the load cell is so mounted as to be readily removable so that it can be removed for example during transportation.

A door 27 is mounted on each end of the crate. Door 27 is suspended at its upper edge by a pair of roller or wheel sets 28 which are engaged within a track 29, the rollers or wheels of each set 28 being located in curved lips in a conventional manner. The track 29 has attached thereto a pair of spaced apart lugs 30 which are engagable in the open top ends of uprights 21 of the weighing crate (see FIG. 5) and pinned by pins 30a. The doors 27 and their associated tracks 29 can thus be readily removed from the weighing crate such as for transportation purposes or where the crate is not being used for weighing animals. The lower edge of each door 27 is slidingly located in a channel member 31 attached to the base of the weighing crate.

A pair of arms 32 are mounted to one of the frame base rails 10. These arms 32 are pivotally mounted by one end on pins 33 to the rail 10 and in FIGS. 1 and 2 they are shown in their stowed or out of use position. The arms 32 are, however, pivotable in the direction of the arrow in FIG. 2 through 270° so that the free ends thereof rest on the other rail 10 with each arm being positioned beneath an end of the weighing crate so as to support the crate when it is not being used.

Each door 27 has an operating handle 34. The doors can be reversed from their position shown so that the handles 34 project outwardly as shown in dotted detail in FIG. 2. With the arrangement shown in FIGS. 1 and 2 the doors can be operated by a single operator positioned on one side of the apparatus and facing the display unit 19 with the doors 27 reversed, however, an operator stands at the end of the apparatus so as to not only be able to operate the door but also observe the identification tag of the animal to be weighed.

In FIG. 3 there is illustrated a tray 35 which is mountable on the weighing crate so that objects such as for example a fleece can be weighed. The tray 35 can be mounted as shown in dotted detail, above the weighing crate by legs 35a projecting from the tray being engaged in the open upper ends of the crate uprights 21 which are adjacent the display unit 19. In this arrangement the doors 27 with tracks 29 need to be removed to allow for mounting of the tray 35. The tray 35 can also be used as a lamb board by being positioned, as shown in dotted detail, between the door tracks 29.

The tray 35 has a dual function in that it can be positioned within the weighing crate, as shown in FIG. 3, to act as a restricting or partitioning device so as to restrict the movement of undersized animals when being weighed.

The main frame is provided with lifting handles 41 which project horizontally from each upright 14 and 15. As shown a lecturn 45 can be mounted by a tubular support 46 inserted into an open end of one of the handles 41.

The restraining device consists, in the preferred form, of a single light steel wire or cable 36 and particular reference will be made to FIG. 4 of the drawings which is a schemmatic diagram of the wire 36. The wire has one end clamped, preferably in the clamping/tensioning arrangement 38 which is more particularly shown in FIG. 7. The wire proceeds along upright 14 to be clamped at b in the clamping arrangement shown in FIG. 6 whereupon it proceeds to a midpoint clamp a on cross-member 23a to return to clamp point b on upright 15. It then returns to clamp point b on upright 14 via clamp point a on the other of the upper cross-members 23a. The wire then proceeds down upright 14 to take the same route about clamp points baba on the underside of the crate. It is noted that the runs of wire to one end of each of the top and bottom of the crate are always on top of the runs of wire to the other end at the cross-overs at uprights 14 and 15. A parallelogram baba is formed by the runs of wire on both the upper and lower sides of the crate.

This single wire 36 provides the restraining device for the crate relative to the main frame when the crate is suspended from a single load cell. Accordingly, the restraining device ensures only vertical load forces are transferred to the load cell as any off centre load forces are transferred along a horizontal moment to be transferred vertically through the load cell.

By way of example clamping point A is shown in FIG. 5. This clamping point consists of a bolt 43 extending through a flange projecting from cross-member 23a with a nut 44. A pair of washers 45 are located between nut 44 and member 22 to clamp therebetween the wire 36.

A similar arrangement is shown in FIG. 6, however, the wire 36 is clamped twice, once between the washers 45a between the head of the bolt 43 and upright 14 and once between washers 45b located between the nut 44 and upright 14.

Means are provided for tensioning the wire and these can be a turnbuckle arrangement 37 (as shown in FIG. 8) or a crank type arrangement 38 with the lifting handle 41 on upright 14. This crank arrangement 38 is shown in more detail in FIG. 7 and consists of a slotted shaft 39 journalled in an opening 40 in the tubular lifting handle 41 projecting from upright 14. The wire 36 passes through a pair of opposed openings 42 to be engaged in shaft 39. Means, not illustrated, are provided to lock the shaft against rotation once the required tension is achieved.

A second form of the restraining device is shown in FIG. 8 of the drawings which once again is a schemmatic diagram of the wire 36. For ease of reference the configuration of the wire will be described from where it is clamped by a suitable clamping device K on the underside of the weighing crate. The wire extends from device K to wind around upright 14 and be clamped at b whereupon it extends along upright 14 to be clamped thereon at a. It then extends around the frame of the crate to be clamped at points B, D, C and A to come back to upright 14 and be once again clamped at a. The wire then extends across the top of the weighing crate to be clamped at e to upright 15. Point J in this run of the wire is attached to the single load cell 26. The wire then continues around the other frame of the crate being clamped at points E, G, H and F, to return to clamping point e on upright 15 whereupon it extends down upright 15 to be clamped at d and thence back to point K.

In use the arms 32 are positioned beneath the weighing crate so as to support it and the wire 36 is then tensioned so that all runs of the wire are straight and tensioned such that they are taut in operation. With the arms moved to their inoperative position the apparatus is ready for weighing.

Where animals are being weighed one door 27 is opened and the animal allowed to enter into the crate. Once the weight has been recorded the other door is opened to allow the animal to exit. Inanimate objects can be weighed by being placed in the crate or in the tray 35.

By using the crate restraining arrangement as disclosed an accurate weight can be recorded irrespective of where an animal stands on the floor 20 or where an object is placed on floor 20 or tray 35. This is achieved even though only a single load cell 26 is utilized and results from the fact that the runs of wire 36 on the crate are horizontal and parallel with one another with each run on one side of the crate being above a run of the wire on the other side. As a consequence any off centre load is transferred along a horizontal moment to then be transferred vertically through the load cell. In other words only vertical load forces are applied to the load cell with the end result that an animal's weight will be recorded accurately irrespective of whether the animal stands in the middle of the weigh crate or to one end and/or side.

It will be appreciated by those skilled in the art that many permentations and combinations of the invention herein described can be made embodying the principle of the restraining device particularly illustrated in FIG. 4. It will also be seen that it is possible to provide a crate restraining system comprising a pair of single wires 34, one for each parallelogram.

What I claim is:

1. Weighing apparatus suitable for weighing livestock comprising:
    a crate open at at least one end providing a platform on which an object to be weighed may be located,
    a frame encompassing but spaced from said crate, a single point weighing device on said frame, said crate being slung from said weighing device, crate restraining means for maintaining said crate spaced from said frame comprising a single flexible member and a single anchor point and tie on each end of said crate and a single mounting on opposite sides of said frame, the arrangement being such that in use when said flexible member is tensioned and anchored said crate is restrained against lateral movement against said frame without affecting vertical loading on said single point weighing device.

2. Weighing apparatus as claimed in claim 1 wherein the single point weighing device is a single load cell.

3. Weighing apparatus as claimed in claim 1 wherein said frame comprises a pair of substantially parallel lower rail members and a pair of upright members projecting from, at or adjacent the centre of said rail members and an upper transverse member joining said upright members.

4. Weighing apparatus as claimed in claim 2 wherein said crate comprises a rectilinear structure open at either end having a floor.

5. Weighing apparatus as claimed in claim 4 wherein there is provided a sliding door mounted to slide on rails at either end of said crate.

6. Weighing apparatus as claimed in claim 5 wherein a rail supporting the upper end of each said door is removable to permit removal of said doors from said crate.

7. Weighing apparatus as claimed in claim 1 wherein there is provided on said frame at least one member which is pivotal to a position in which it supports said crate when said crate is in an inoperative position.

8. Weighing apparatus as claimed in claim 1 wherein each door is provided with an operating handle each of which projects over said crate in a first position but is reversible so as to project outwardly from the end of said crate in a second position.

9. Weighing apparatus as claimed in claim 1 wherein the single flexible member is anchored near the top of said crate and near the bottom of said crate to form a pair of upper and lower parallelograms, a pair of opposite apices of each said parallelogram being mounted to upper transverse frame members on said crate and a pair of opposite apices of each said parallelogram being mounted on opposite upright members of said frame.

10. Weighing apparatus as claimed in claim 9 further including tensioning means for tensioning said flexible member.

11. Weighing apparatus as claimed in claim 9 modified by providing two flexible members, one for each parallelogram.

12. Weighing apparatus as claimed in claim 9 wherein said flexible member(s) is a length of wire.

13. Weighing apparatus as claimed in claim 1 wherein there is provided a weighing tray/restricting device which when stood on one end acts as an insert in said crate to restrain movement of undersized animals and when mounted to the crate acts as a tray for weighing objects.

14. Weighing apparatus as claimed in claim 2 wherein said frame comprises a pair of substantially parallel lower rail members and a pair of upright members projecting from, at or adjacent the centre of said rail members and an upper transverse member joining said upright members.

15. Weighing apparatus as claimed in claim 3 wherein said crate comprises a rectilinear structure open at either end having a floor.

16. Weighing apparatus as claimed in claim 10 modified by providing two flexible members, one for each parallelogram.

* * * * *

UNITED STATES PATENT AND TRADEMARK OFFICE
CERTIFICATE OF CORRECTION

PATENT NO. : 4,470,471
DATED : September 11, 1984
INVENTOR(S) : ROBERT ALAN MILLS It is certified that error appears in the above-identified patent and that said Letters Patent are hereby corrected as shown below:

Front Page, left hand column, insert:

---FOREIGN APPLICATION PRIORITY DATA

June 11, 1982        New Zeland.............200924---.

Signed and Sealed this

Nineteenth Day of February 1985

[SEAL]

Attest:

DONALD J. QUIGG

Attesting Officer    Acting Commissioner of Patents and Trademarks